US009284042B2

(12) United States Patent
Couderc et al.

(10) Patent No.: US 9,284,042 B2
(45) Date of Patent: Mar. 15, 2016

(54) SYSTEM FOR CONTROLLING PITCH VARIATION OF THE BLADES OF A PROPELLER, A PROPELLER, AND AN AIRCRAFT

(75) Inventors: Gérard Couderc, Vitrolles (FR); Mathilde Chouteau, Saint Grégoire (FR); Romuald Biest, Lambesc (FR)

(73) Assignee: Airbus Helicopters, Marignane (FR)

( * ) Notice: Subject to any disclaimer, the term of this patent is extended or adjusted under 35 U.S.C. 154(b) by 972 days.

(21) Appl. No.: 13/617,544

(22) Filed: Sep. 14, 2012

(65) Prior Publication Data
US 2013/0078096 A1    Mar. 28, 2013

(30) Foreign Application Priority Data

Sep. 23, 2011   (FR) ...................................... 11 02895

(51) Int. Cl.
  *B64C 11/38*   (2006.01)
  *B64C 11/42*   (2006.01)
  *F01D 7/00*   (2006.01)
(52) U.S. Cl.
  CPC ................. *B64C 11/38* (2013.01); *B64C 11/42* (2013.01); *F01D 7/00* (2013.01)
(58) Field of Classification Search
  CPC ........... F01D 7/00; B64C 11/06; B64C 11/30; B64C 11/38; B64C 11/385; B64C 11/40; B64C 11/42
  See application file for complete search history.

(56) References Cited

U.S. PATENT DOCUMENTS

| 5,174,718 | A | 12/1992 | Lampeter |
| 5,186,608 | A * | 2/1993 | Bagge .............................. 416/37 |
| 7,758,310 | B2 | 7/2010 | Cotton |
| 8,061,992 | B2 * | 11/2011 | Ferrier ....................... 416/157 R |
| 2009/0180883 | A1 * | 7/2009 | Muhlbauer .................... 416/156 |
| 2011/0002786 | A1 * | 1/2011 | Perkinson ..................... 416/154 |
| 2012/0099991 | A1 * | 4/2012 | Muhlbauer ............... 416/157 R |

FOREIGN PATENT DOCUMENTS

FR    2927879 A1    8/2009

OTHER PUBLICATIONS

Search Report and Written Opinion; Application No. 1102895; dated Apr. 25, 2012.

* cited by examiner

*Primary Examiner* — Craig Kim
*Assistant Examiner* — Brian P Wolcott
(74) *Attorney, Agent, or Firm* — Brooks Kushman P.C.

(57) ABSTRACT

A system (10) having a control plate (15) for controlling the pitch of the blades (5) of a propeller, a power block (20), and a directional control valve (30) for feeding said power block (20) with fluid. The power block (20) is sealed and includes at least a body in which at least one piston (22) that is secured to a piston rod (25) projecting from said body (21) is movable in translation, a repeater rod (50) connecting said piston rod (25) to said control plate (15). The control valve (30) is sealed and comprises a stationary manifold (35) and a movable manifold (40) that is movable in rotation, said stationary manifold (35) being controlled by a control lever (31) connected by repeater means (32) to said repeater rod (50). A respective pipe (60) connects each chamber (23, 24) of said power block (20) to said movable manifold (40).

18 Claims, 3 Drawing Sheets

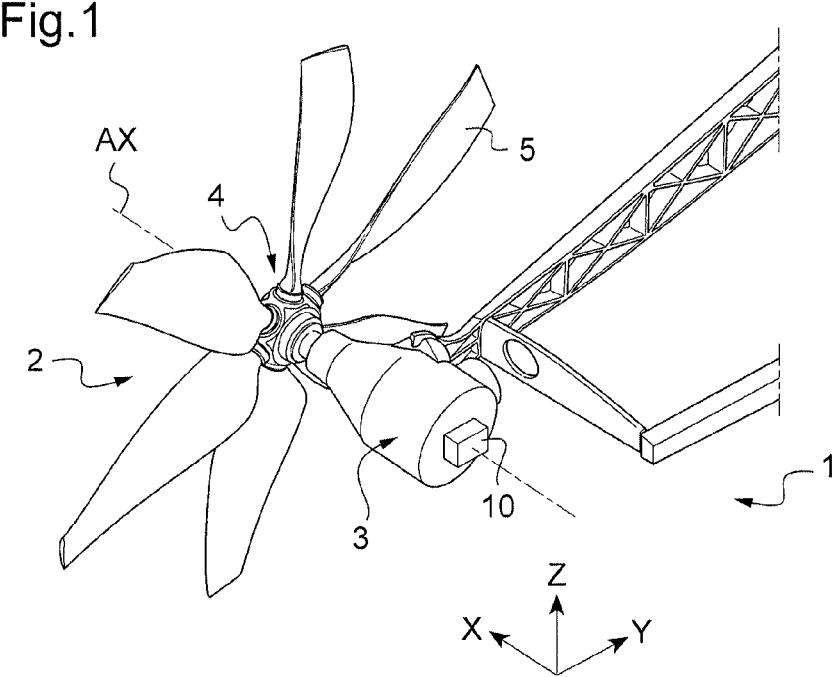
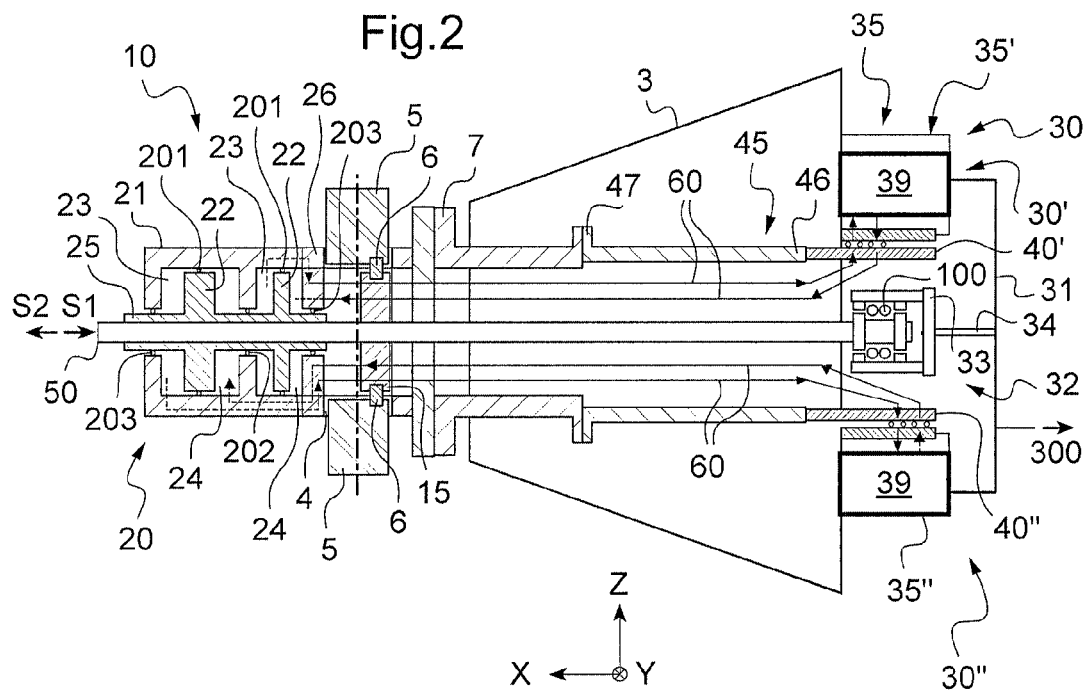

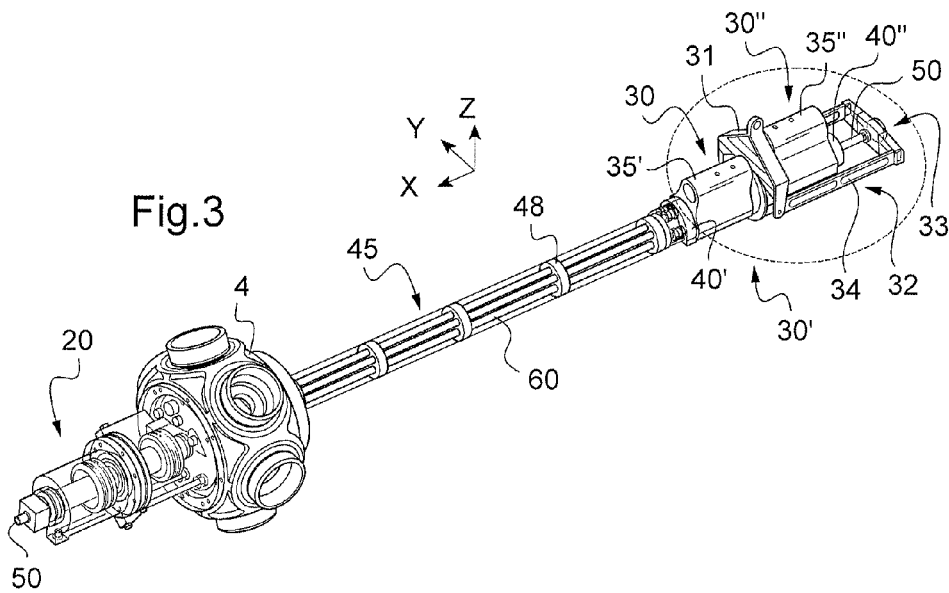
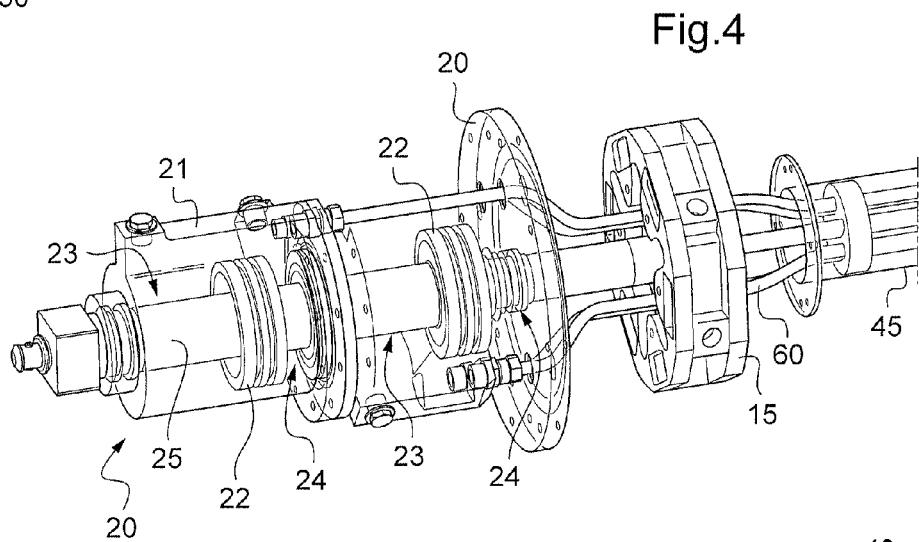
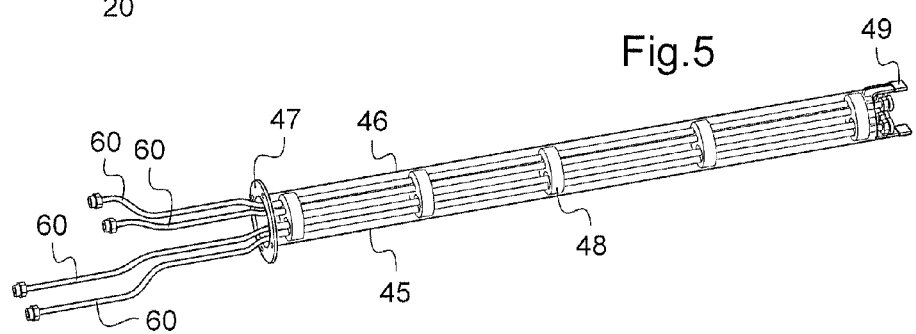

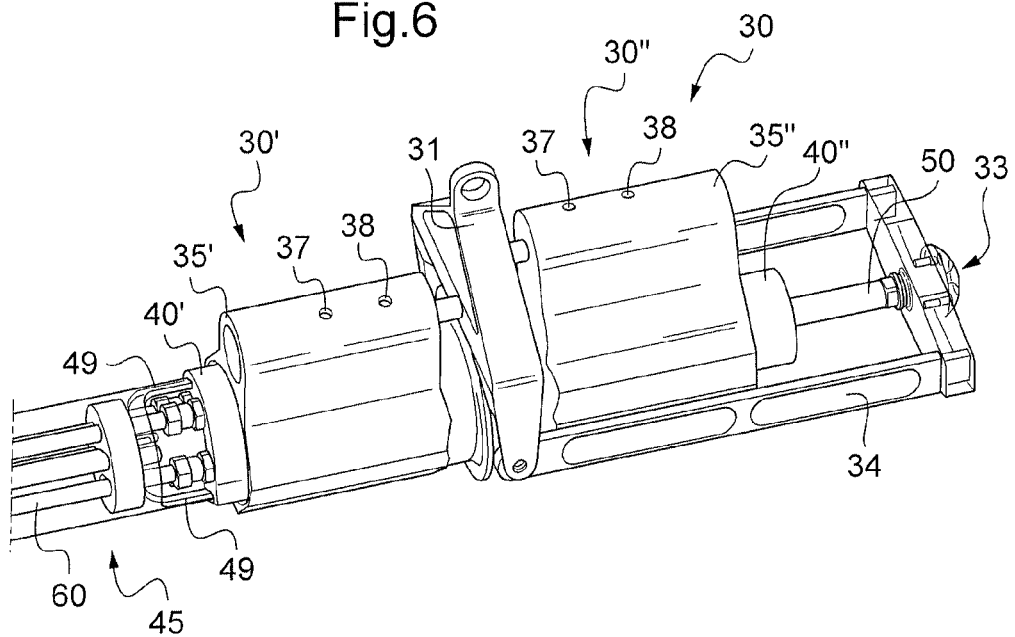
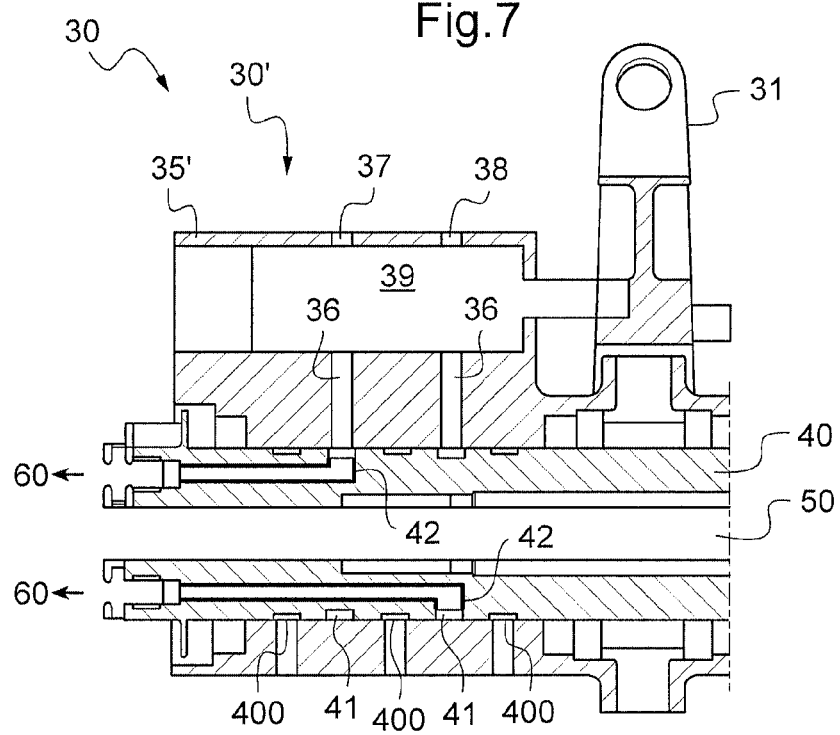

SYSTEM FOR CONTROLLING PITCH VARIATION OF THE BLADES OF A PROPELLER, A PROPELLER, AND AN AIRCRAFT

CROSS REFERENCE TO RELATED APPLICATIONS

This application claims priority to French patent application No. FR 11 02895 filed on Sep. 23, 2011, the disclosure of which is incorporated in its entirety by reference herein.

BACKGROUND OF THE INVENTION (1) Field of the Invention

The present invention relates to a system for controlling pitch variation of the blades of a propeller, to a propeller, and to an aircraft.

The invention is thus situated in the narrow technical field of controls for a propeller.

It is conventional to use propellers that are arranged on a lift surface of an aircraft in order to propel it. By driving the movement of air through itself, each propeller delivers a force suitable for generating traction or propulsion, and consequently for causing the aircraft to move forwards in translation.

Thus, a propeller generally comprises a hub secured to a plurality of blades, the hub being covered by a conical fairing.

(2) Description of Related Art

In the early days of aviation, propellers were provided with a plurality of blades at a pitch that was fixed, the blades and the hub forming a single block. Such propellers of a first type were thus known as "fixed-pitch propellers".

The pitch of the blades was consequently "frozen" at a value determined when the propeller was manufactured. The airfoils of such a propeller can be provided with a variety of "settings". Depending on the intended mission, a pilot can choose to install a propeller of small pitch to enhance climbing, or a propeller of large pitch in order to optimize cruising flight.

In addition to not being able to have a propeller that is optimized for all missions, it can readily be understood that that first type of propeller presents difficulties, since the entire propeller, and in particular the block comprising the blades and the hub, needs to be changed in order to go from one configuration to another.

A significant improvement to that first type of propeller is known. It comprises a second type of propeller known as a "ground adjustable pitch" propeller. The pitch of the blades of such a propeller can thus be adjusted on the ground. By slackening a collar clamping the blades, it is possible to pivot the blades into a desired position in order to change their pitch.

Compared with the first type of propeller, that second type avoids the need to remove the propeller. Nevertheless, that adjustment clearly cannot be performed in flight.

A third type of propeller known as a "variable pitch" propeller was then devised. The aircraft has a system for controlling pitch variation that enables the pitch of the propeller blades to be varied while in flight.

Conventionally, such a pitch variation control system has a hydraulic pump activated by the pilot via a lever, a hydraulic chamber provided under the nose cone of the propeller, and a piston connected to the blades via connecting rods.

Depending on the order given by the pilot, the pump injects fluid into the hydraulic chamber via a flexible pipe or hose. The resulting variation in the pressure in said hydraulic fluid causes the piston to move. The blades are then caused to pivot about their respective pitch variation axes by the piston.

That type of propeller thus enables the pitch of the blades to be varied in flight so as to go from a small pitch on takeoff to a large pitch in cruising flight.

Furthermore, it should be observed that in the event of the power plant driving the rotation of the propeller, the blades can be set at a pitch for providing minimum resistance to the relative wind, thereby minimizing drag. This configuration is referred to as "feathering" and the various airfoils of the blades of the propeller are held in "the eye of the wind".

Nevertheless, that third type of propeller is not entirely satisfactory. If during cruising flight the pilot raises the nose of the aircraft, the speed of rotation of the propeller drops and the aircraft loses speed.

Consequently, a fourth type of propeller has been devised for maintaining optimum propulsion or optimum traction as a function of the orientation of the propeller, where the fourth type of propeller is referred to as a "constant-speed" propeller.

As with the third type, a hydraulic device is provided for varying the pitch of the blades of the propeller in flight.

Furthermore, the pilot controls a throttle lever in order to adjust the power delivered by the power plant of the aircraft.

Regulator means are then implemented to control both the power of the power plant and the pitch of the blades in order to maintain the speed of rotation of the propeller constant.

Optionally, the aircraft includes a lever that the pilot can use for setting the speed of rotation of the propeller.

The pitch variation control system used in the third and fourth types of propeller is effective. Nevertheless, it can be difficult and sometimes even impossible to implement.

If the hydraulic fluid feed needs to pass via the power transmission shaft driving rotation of the propeller, then arranging a hose can be seen to be impossible since the hose would need to perform rotary motion.

Furthermore, for reasons of safety, it can be necessary to duplicate pitch variation systems, which is found to be difficult.

Consequently, the pump and hose assembly has been replaced by a hydraulic directional control valve with slides and a link tube including channels for feeding a hydraulic chamber arranged in the hub of the propeller.

The link tube thus has a first end connected to a control piston defining said hydraulic chamber and a second end that rotates and that moves in translation inside the valve.

Document FR 2 927 879 describes a rigid hydraulic control shaft having internal grooves for forming channels.

The hydraulic valve then includes a control rod operable by a pilot via a flight control. As a function of its position, the control rod may connect the second end of the link tube to a fluid feed circuit in order to increase the pressure that exists in the hydraulic chamber, or else it may connect the second end of the link tube to a fluid return circuit in order to reduce the pressure that exists inside the hydraulic chamber.

For example, by pushing the control rod, a pilot connects the hydraulic chamber with the feed circuit. The channels in the link tube thus convey fluid under pressure into the hydraulic chamber of the piston so as to increase the pitch of the blades towards a large pitch.

Conversely, by pulling on the control rod, a pilot connects the hydraulic chamber to the fluid return circuit. Under the effect of a return spring and of aerodynamic forces, fluid is expelled from the hydraulic chamber. The piston reverses together with the control plate, thereby reducing the pitch of the blades towards a small pitch.

It should be observed that the link tube moves together with the piston. As a result, the channels conveying fluid to the propeller hub perform both rotary movement and movement in translation relative to the control rod. It is therefore difficult to achieve good sealing.

Furthermore, it can be understood that it does not suffice for the pitch-changing system to be capable of changing the pitch of the blades, it must also be capable of moving the blades at a speed that is appropriate for the maneuverability requirements of the aircraft.

Furthermore, the pitch-varying system is difficult to mount. In order to mount the hydraulic valve, it is necessary firstly to mount the power block including the piston inside the hub, and then the link tube, and finally the hydraulic valve. Consequently, the hydraulic valve is mounted piece by piece.

Sealing between the various members of the system, and sealing between the members of the system and the outside of the system cannot be verified until that moment. It would appear to be impossible to test the power block or the valve for sealing in the absence of the link tube. If any one of the parameters is unsatisfactory, it is then necessary to disassemble the system in full in order to verify it.

Furthermore, the combined movements in rotation and in translation of the link tube inside the control rod can, over time and as a result of wear, give rise to an increase in control forces and might even lead to jamming of the control rod on the link tube.

BRIEF SUMMARY OF THE INVENTION

An object of the present invention is thus to propose a system for controlling blade pitch variation of a propeller provided with various subassemblies that can be tested separately while also reducing the risk of a jamming phenomenon occurring.

It should be observed that the state of the art includes, for example: documents U.S. Pat. No. 7,758,310 and U.S. Pat. No. 5,174,718.

Document U.S. Pat. No. 7,758,310 describes a tube defining a single channel leading to a hydraulic chamber of a fairing secured to a propeller hub. The tube is free to move in translation. Nevertheless, a scissors assembly prevents the tube from moving in rotation about its own longitudinal axis.

The hydraulic chamber is defined by a single-acting piston surrounding an end of the tube.

Document U.S. Pat. No. 5,174,718 describes a tube feeding two hydraulic chambers arranged on either side of a double-acting piston.

Document US 2011/002786 presents a system for controlling blade pitch variation of a propeller that includes a control plate suitable for modifying the pitch of the blades. Furthermore, the system includes a power block suitable for moving the control plate in translation in a longitudinal direction and a directional control valve suitable for feeding the power block with fluid in order to move the control plate.

The power block includes an outside body in which a piston moves in translation along a longitudinal direction, the piston separating a first chamber from a second chamber. The piston is secured to a piston rod that is connected to the control plate.

In addition, that system includes one hydraulic line per chamber connecting each of the chambers of said power block to the control valve.

According to the invention, a system for controlling pitch variation of the blades of a propeller comprises a control plate suitable for modifying the pitch of the blades, a power block suitable for moving the control plate in translation in a longitudinal direction, and a directional control valve suitable for feeding the power block with fluid in order to move the control plate.

This system is remarkable in particular in that:

the power block is sealed, the power block including at least an outside body in which at least one piston moves in translation in a longitudinal direction, each piston separating a first chamber from a second chamber, each piston being secured to a piston rod that projects from the body, the body including fastener means for fastening to a hub of a propeller, and a repeater rod connecting the piston rod to the control plate;

the control valve is sealed, the control valve comprising a stationary manifold and a movable manifold that is movable in rotation, the control valve including a fastener system for fastening the movable manifold to said hub, the stationary manifold being controlled by a control lever connected by decoupling and position-repeater means to said repeater rod; and the system including one pipe per chamber connecting each chamber of said power block to said movable manifold.

Consequently, the power block can be manufactured and tested independently of the other elements of the system, since the chambers of the power block are specifically not in contact with the outside of the power block.

Similarly, the control valve may be manufactured and tested independently of the other elements of the system.

Furthermore, since the control valve has a movable manifold suitable for rotating, it is possible to use pipes for connecting the control valve to the power block, the assembly comprising the power block, the pipes, and the movable manifold rotating together with the hub.

Furthermore, the repeater rod is not in contact with the slide of the control valve, but passes through the movable manifold. Under such circumstances, the risk of the above-mentioned jamming phenomenon occurring is at least reduced because there remain only pure movements in translation or in rotation between any two parts that are in contact.

Finally, the combination of means making up the system makes it possible to obtain a device that is easily arranged on a propeller.

Thus, a pilot can modify the pitch of the blades of a propeller by using the above-described system. For example, the pilot may use flight controls for operating the control lever. The control lever then actuates the stationary manifold, which feeds fluid to the required chambers via the movable manifold and the pipes.

Under such circumstances, the power block transforms the fluid pressure in the chambers into movement in translation that moves the control plate. The power block is thus a sealed actuator including at least one piston for moving a piston rod that actuates the control plate.

More precisely, the piston rod moves a repeater rod that moves the control plate. In parallel, the repeater rods move the control lever via the decoupling and position-repeater means. As it moves, the control lever actuates the stationary manifold, which ceases to feed the movable manifold with fluid so as to stop changing the pitch of the blades.

The system may also include one or more of the following additional characteristics.

For example, the movable manifold may include one annular link groove per pipe, each link groove firstly coinciding with a delivery duct of the stationary manifold, and secondly being connected by a channel to a pipe.

The link groove makes it easy for a fluid to pass from a stationary frame of reference associated with the stationary manifold to a moving frame of reference associated with the assembly comprising the power block, the pipes, and the movable manifold.

It should be observed that each pipe may be screwed firstly to the power block and secondly to the movable manifold by means of a conventional device having gasket type sealing means, for example. The system thus presents the required sealing and is easy to assemble.

In another aspect, the stationary manifold optionally includes an inlet orifice and an outlet orifice together with two delivery ducts per piston, the stationary manifold including a linear or rotary slide controlled by the control lever in order to connect each orifice to a delivery duct.

As a function of the position of the slide, the inlet orifice communicates with one or the other of the delivery ducts or with none of the delivery ducts. Similarly, the outlet orifice communicates with one or the other of the delivery ducts or with none of the delivery ducts.

It is thus possible to connect each chamber of the power block to an inlet orifice or to an outlet orifice as a function of the order given by the control lever.

Each piston is thus of the double-acting type, so each chamber beside a piston can thus be fed with fluid or connected to a fluid return circuit.

Furthermore, each pipe may pass through said control plate, in particular for the purpose of making the system more compact.

In addition, the system for fastening the movable manifold may comprise a drive tube secured to the movable manifold and suitable for being fastened to a hub, the pipes passing along the drive tube.

It is possible to envisage making provision for a device for fastening the pipes in the drive tube so as to make up a subassembly that is easily handled.

In another aspect, the decoupling and position-repeater means may include a cage co-operating with the repeater rod via at least one rolling bearing means, the cage being constrained to move in translation with said control lever.

The decoupling and position-repeater means then serve to connect the repeater rod that is capable of moving both in rotation and in translation to a control lever that is suitable for moving only in translation, for example.

It should be observed that the repeater rod optionally passes in a longitudinal direction through the movable manifold, the control plate, and the power block. The repeater rod may comprise a single segment or a plurality of segments that are hinged to one another.

In a preferred variant seeking to maximize safety:
the power block includes two pistons connected together by the piston rod and each separating a first chamber from a second chamber; and
the stationary manifold is provided with a front part and a rear part co-operating respectively with a front portion and a rear portion of the movable manifold, each portion including an inlet orifice and an outlet orifice together with two delivery ducts and a linear or rotary slide controlled by the control lever, four pipes serving to connect each delivery duct to a respective chamber.

In addition to a system for controlling blade pitch variation, the invention also provides a propeller.

According to the invention, a propeller is provided with a hub having a plurality of blades, said propeller including means for driving said hub in rotation and a control system for varying the pitch of said blades, said control system comprising a control plate co-operating with said blades and a power block suitable for causing said control plate to move in translation in a longitudinal direction, and a directional control valve suitable for feeding said power block with fluid.

The propeller is remarkable in particular in that said system is a system that includes the above-mentioned characteristics and comprises in particular the following characteristics:

the power block is sealed, the power block including at least an outside body in which at least one piston moves in translation in a longitudinal direction, each piston separating a first chamber from a second chamber, each piston being secured to a piston rod that projects from said body, the body including fastener means for fastening to the hub, a repeater rod connecting the piston rod to said control plate;

the control valve is sealed, the control valve comprising a stationary manifold and a movable manifold that is movable in rotation, the control valve including a fastener system for fastening the movable manifold to the hub, the stationary manifold being controlled by a control lever connected by decoupling and position-repeater means to the repeater rod; and the system including one pipe per chamber connecting each chamber of the power block to the movable manifold.

Furthermore, the invention also provides an aircraft including such a propeller.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIG. 1 is a view of an aircraft of the invention;
FIG. 2 is a diagram of a system of the invention;
FIG. 3 is a view of said system;
FIG. 4 is a view of a power block;
FIG. 5 is a view of a drive tube;
FIG. 6 is a view of a directional control valve; and
FIG. 7 is a fragmentary section of a directional control valve.

DETAILED DESCRIPTION OF THE INVENTION

Elements present in more than one of the figures are given the same references in each of them.

It should be observed that three mutually orthogonal directions X, Y, and Z are shown in some of the figures.

The first direction X is said to be "longitudinal". The term "longitudinal" relates to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

FIG. 1 shows an aircraft 1 provided with a structure fitted with a propeller 2. Thus, the propeller 2 comprises a hub 4 carrying a plurality of blades 5, the hub 4 being driven by a power gearbox 3.

The propeller is provided with a system 10 for controlling variation of the pitch of the blades 5, this system 10 being fastened in particular on the power gearbox 3.

FIG. 2 shows the system 10.

Each blade 5 has a root inserted in the hub 4, the root including a drive peg 6. Under such circumstances, the system 10 for controlling variation of the pitch of the blade 5 is provided with a control plate 15 that co-operates with the drive pegs.

Consequently, movement of the control plate 15 in longitudinal translation along the axis of rotation of the hub causes the pitch of the blades 5 to be modified.

In order to be able to move the control plate 15, the system 10 possesses a power block 20 that represents a control actuator suitable for moving the control plate.

The power block is a sealed block fastened to the hub 4 by fastener means 26, e.g. a flange.

The power block 20 comprises an outside body 21 secured to the fastener means 26.

The body 21 defines at least one inside space shared between a first chamber 23 and a second chamber 24 that are separated by a piston 22. The piston 22 is capable of sliding in the inside space in a longitudinal direction that coincides with the axis of rotation of the hub 4, for example.

By way of example, the power block may include two inside spaces in which two pistons move, each piston separating a respective inside space into a first chamber and a second chamber.

The pistons are secured to a piston rod 25 fastened to a repeater rod 50, the repeater rod 50 being secured to the control plate 15. The repeater rod may be provided with a single segment, or with a plurality of segments.

Consequently, movement of the piston 22 in translation causes the piston rod 25 to move in translation and thus causes the repeater rod and the control plate 15 to move in translation, thereby varying the pitch of the blades 5.

For this purpose, the piston rod 25 projects from the body 21 in order to be capable of being fastened to the repeater rod 50.

It should be observed that the power block is provided with multiple gaskets in order to avoid fluid flowing from inside the power block to outside the power block.

In particular, there can be found:

a gasket 201 between each piston 22 and the body 21;

a gasket 202 between the piston rod 25 and the body 21 so as to separate two inside spaces; and a gasket 203 for separating each inside space from the outside.

Consequently, each chamber 23, 24 is separated from the outside of the power block by an element of the power block 20. It is therefore possible to test the sealing of the power block 20 without any need for a member of the system 10 that does not belong to said power block 20.

In order to move each piston 22 in an inside space of the power block 20, the system 10 includes a directional control valve 30 suitable for transferring fluid into the chambers 23 and 24, possibly such as oil. The control valve 30 then serves to put a fluid delivery circuit and a fluid return circuit of the aircraft into communication with the chambers of the power block, as a function of an order given by a flight control.

By delivering the first chambers 23 with fluid and returning fluid that was contained in the second chambers 24, the control valve causes the pistons to move in a first direction S1. Conversely, by delivering the second chambers 24 while returning the fluid that was contained in the first chambers 23, the control valve causes the pistons to move in a second direction S2 opposite from the first direction S1.

Like the power block 20, the control valve 30 is sealed so as to be capable of being tested independently of the other members of the system 10.

Furthermore, the control valve 30 comprises a stationary manifold 35 and a movable manifold 40.

The stationary manifold 35 is fastened to the power gearbox 3.

In contrast, the movable manifold 40 is fastened by a fastener system 45 to the hub 4. The fastener system 45 may comprise a hollow drive tube suitable for being secured to the movable manifold and to the hub 4.

The stationary manifold is then associated with a stationary frame of reference while the movable manifold is associated with a frame of reference in rotation about the axis of rotation of the hub 4.

In addition, each manifold includes one control member per piston of the power block.

Consequently, in the example shown, the stationary manifold 35 has two portions referred to as a "front" part 35' and a "rear" part 35". Similarly, the movable manifold 40 has two portions referred to as a "front" portion 40' and as a "rear" portion 40". The front part 35' and the front portion 40' co-operate with the chambers of a piston referred to as the "front" piston, while the rear part 35" and the rear portion 40" co-operate with the chambers of a "rear" piston.

In order to feed the required chambers, each portion of the stationary manifold is thus provided with a slide 39 controlled by a control lever 31 connected to the flight control 300.

It should be observed that the control lever 31 is linked to the repeater rod 50 by decoupling and position-repeater means 32.

The repeater means 32 include a cage 33 co-operating with the repeater rod 50 via at least one rolling bearing 100, e.g. a ball bearing. The cage 33 is also linked to the control lever by a mechanical link 34.

Thus, the repeater means couple the repeater rod 50 and the control lever in translation, but decouple the repeater rod 50 from the control lever in rotation.

The repeater rod 50 and the control lever 31 are thus linked together in translation. Nevertheless, the rotary motion of the repeater rod 50 driven by the hub 4 is not transmitted to the control lever 31.

It should be observed that the repeater rod 50 may pass through the movable manifold 40, the control plate 15, and the power block 20.

In addition, in order to connect each chamber 23, 24 of the power block 20 to the control valve 30, the system 10 includes one pipe 60 per chamber. The movable manifold 40 and the body 21 together perform rotary motion under drive from the hub, so there is no danger of the pipes becoming twisted.

By way of example, each pipe 60 is then screwed to the movable manifold, and also to the body 21 in register with the required chamber.

FIG. 3 is a three-dimensional view of the system 10.

There can be seen in particular the presence of a control valve 30 having front control means 30' and rear control means 30" that feed a two-piston power block 20 with fluid.

FIG. 4 shows more precisely the power block 20 and the control plate 15. It can be seen that the pipes 60 coming from the control valve 30 pass through the control plate 15 in order to be screwed to the body 21 of the power block 20.

FIG. 5 shows a fastener system 45 for fastening the movable manifold 40 to the hub 4.

The fastener system 45 includes a drive tube 46 provided with a fastener flange 47 for fastening to the hub 4. Any other fastener device could be envisaged.

Furthermore, the drive tube 46 is hollow in order to pass the pipes 60 connecting the control valve 30 to the power block 20.

The drive tube 46 may then include holder means 48 for holding the pipes 60.

In addition, the drive tube 46 includes link interfaces 49.

With reference to FIG. 6, these link interfaces 49 may be inserted in the movable manifold, and more particularly in the front portion 40' of the movable manifold 40.

With reference to FIG. 7, the stationary manifold has an inlet orifice 37 and an outlet orifice 38, together with two delivery ducts 36 per piston 22.

A linear or rotary slide 39 controlled by the control lever 31 serves to connect each orifice 37, 38 to a delivery duct 36.

In addition, the movable manifold 40 includes one annular link groove 41 per pipe 60. Under such circumstances, each link groove 41 firstly coincides with a delivery duct 36 of the stationary manifold 35 and is secondly connected via a channel 42 to a pipe 60 and thus to a chamber.

Under such conditions, each chamber may be connected either to an inlet orifice or to an outlet orifice or to no inlet or outlet orifice, as a function of the position of the associated slide 39.

It should be observed that the movable manifold also includes additional grooves 400. Each of these additional grooves 400 faces a drainage duct for draining the movable manifold 40, the additional grooves 400 serving to drain fluid that may be present as a result of an internal leak in operation.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A system for controlling pitch variation of blades of a propeller, the system comprising a control plate suitable for modifying the pitch of the blades, a power block suitable for moving the control plate in translation, and a directional control valve suitable for feeding the power block with fluid, wherein:
the power block is sealed, the power block including at least an outside body in which at least one piston moves in translation in a longitudinal direction, each piston separating a first chamber from a second chamber, each piston being secured to a piston rod that projects from the body, the body including fastener means for fastening to a hub of a propeller, and a repeater rod connecting the piston rod to the control plate;
the control valve is sealed, the control valve comprising a stationary manifold and a movable manifold that is movable in rotation, the control valve including a fastener system for fastening the movable manifold to the hub, the stationary manifold being controlled by a control lever connected by decoupling and position-repeater means to the repeater rod, the decoupling and position-repeater means including a cage co-operating with the repeater rod via at least one rolling bearing means, the cage being constrained to move in translation with the control lever; and
the system including one pipe per chamber connecting each chamber of the power block to the movable manifold.

2. A system according to claim 1, wherein the movable manifold includes one annular link groove per pipe, each link groove firstly coinciding with a delivery duct of the stationary manifold, and secondly being connected by a channel to a pipe.

3. A system according to claim 1, wherein the stationary manifold includes an inlet orifice and an outlet orifice together with two delivery ducts per piston, the stationary manifold including a linear or rotary slide controlled by the control lever in order to connect each orifice to a delivery duct.

4. A system according to claim 1, wherein each pipe passes through the control plate.

5. A system according to claim 1, wherein the fastener system comprises a drive tube secured to the movable manifold and suitable for being fastened to a hub, the pipes passing along the drive tube.

6. A system according to claim 1, wherein the repeater rod passes through the movable manifold, the control plate, and the power block.

7. A system according to claim 1, wherein each pipe is screwed firstly to the power block and secondly to the movable manifold.

8. A system according to claim 1, wherein:
the power block includes two pistons connected together by the piston rod and each separating a first chamber from a second chamber; and
the stationary manifold is provided with a front part and a rear part co-operating respectively with a front portion and a rear portion of the movable manifold, each part including an inlet orifice and an outlet orifice together with two delivery ducts and a linear or rotary slide controlled by the control lever, four pipes serving to connect each delivery duct to a respective chamber.

9. A propeller provided with a hub having a plurality of blades, the propeller including means for driving the hub in rotation and a control system according to claim 1 for varying pitch of the blades.

10. An aircraft, including a propeller according to claim 9.

11. The system of claim 1, wherein the control lever is mechanically connected to the repeater rod by the decoupling and position repeater means.

12. A system for controlling pitch variation of blades of a propeller, the system comprising:
a control plate configured to modify blade pitch;
a sealed power block configured to move the control plate in translation, the sealed power block having an outer body configured to fasten to a propeller hub;
a sealed directional control valve configured to supply the sealed power block with fluid, the sealed directional control valve having a stationary manifold and a movable manifold, the movable manifold being configured to rotate, the sealed directional control valve being further configured to couple to a propeller hub;
a piston arranged to move within the outer body, the piston dividing the outer body into a first chamber and a second chamber;
a piston rod coupled to the piston and projecting from the outer body;
a repeater rod connecting the piston rod to the control plate;
a control lever configured to control the stationary manifold;
a repeater connecting the control lever to the repeater rod, wherein the repeater includes a cage co-operating with the repeater rod by at least one rolling bearing, the cage being constrained to move in translation with the control lever;
a first pipe connecting the first chamber to the movable manifold; and
a second pipe connecting the second chamber to the movable manifold.

13. The system of claim 12, wherein the movable manifold includes a first annular link groove, a first channel fluidly coupling the first pipe with the first link groove, a second annular link groove, and a second channel fluidly coupling the second pipe with the second link groove, and wherein the stationary manifold includes a first delivery duct in fluid communication with the first link groove and a second delivery duct in fluid communication with the second link groove.

14. The system of claim 12, wherein the stationary manifold includes an inlet orifice, an outlet orifice, a first delivery duct, a second delivery duct, and a slide configured to connect the inlet orifice to the first delivery duct and to connect the outlet orifice to the second delivery duct, the slide being controllable by the control lever.

15. The system of claim 12, wherein the first pipe and the second pipe pass through the control plate.

16. The system of claim 12, wherein the repeater rod passes through the movable manifold, the control plate, and the sealed power block.

17. The system of claim 12, wherein the first pipe is fastened to the sealed power block and to the movable manifold and the second pipe is fastened to the sealed power block and to the movable manifold.

18. The system of claim 12, wherein the control lever is mechanically connected to the repeater rod by the repeater.

\* \* \* \* \*